(12) United States Patent
Arslan

(10) Patent No.: US 12,245,182 B2
(45) Date of Patent: Mar. 4, 2025

(54) IMPROVING ACCURACY OF ROUND-TRIP TIME (RTT) IN HIGH ACCURACY DISTANCE MEASUREMENTS (HADM)

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 280 days.

(21) Appl. No.: 17/980,704

(22) Filed: Nov. 4, 2022

(65) Prior Publication Data
US 2024/0155530 A1    May 9, 2024

(51) Int. Cl.
*H04W 56/00* (2009.01)
*H04W 4/02* (2018.01)

(52) U.S. Cl.
CPC ... *H04W 56/0075* (2013.01); *H04W 56/0035* (2013.01)

(58) Field of Classification Search
CPC ........... H04W 4/00–029; H04W 24/10; H04W 36/0085–0094; H04W 88/00–06
See application file for complete search history.

(56) References Cited

U.S. PATENT DOCUMENTS

| | | | |
|---|---|---|---|
| 8,325,704 B1 | 12/2012 | Lemkin et al. | |
| 2014/0278214 A1* | 9/2014 | Broad | G01S 5/12 342/146 |
| 2015/0168536 A1* | 6/2015 | Banin | H04W 64/00 455/456.2 |
| 2015/0168537 A1* | 6/2015 | Amizur | H04W 64/00 455/456.2 |
| 2017/0250831 A1* | 8/2017 | Aldana | G01S 5/0009 |
| 2019/0391252 A1* | 12/2019 | Waheed | G01S 7/34 |
| 2020/0118372 A1* | 4/2020 | Stitt | H01Q 1/3241 |
| 2022/0292901 A1* | 9/2022 | Cimino | G07C 9/00174 |

* cited by examiner

*Primary Examiner* — San Htun
(74) *Attorney, Agent, or Firm* — Nields, Lemack & Frame, LLC

(57) ABSTRACT

A system and method to improve the accuracy of the measurement of round trip delay in a high accuracy distance measurement (HADM) is disclosed. In one embodiment, the traditional parabolic estimation is used. However, an estimation error is used to compensate for the inaccuracy of the parabolic estimation. This correction may reduce the standard deviation of a measurement by 50% or more. In another embodiment, the parabolic estimation is not used; rather, a different estimation is used, such as an absolute value estimation. In some tests, the absolute value estimation improved the mean measurement value and reduced the standard deviation by 50%.

19 Claims, 11 Drawing Sheets

| DISTANCES | 3.3 ns / 1m | | 33 ns / 10m | |
|---|---|---|---|---|
| | MEAN | STD | MEAN | STD |
| RTT CFE COARSE | 3.42 ns / 1.03 m | 42.02 ns / 12.61 m | 32.42 ns / 9.73 m | 42.28 ns / 12.68 m |
| RTT CORRELATION STANDARD | 2.63 ns / 0.79 m | 10.30 ns / 3.09 m | 32.06 ns / 9.62 m | 10.32 ns / 3.10 m |
| RTT CFE STANDARD | 2.94 ns / 0.88 m | 8.02 ns / 2.41 m | 33.60 ns / 10.08 m | 8.39 ns / 2.52 m |
| RTT CFE STANDARD W/ 1-BIT CORRECTION | 3.18 ns / 0.95 m | 4.12 ns / 1.23 m | 33.60 ns / 10.08 m | 4.10 ns / 1.23 m |
| RTT CFE STANDARD W/ 5-BIT CORRECTION | 3.41 ns / 1.02 m | 3.07 ns / 0.92 m | 33.46 ns / 10.04 m | 2.90 ns / 0.87 m |
| RTT CFE ABSOLUTE VALUE | 3.30 ns / 0.99 m | 2.46 ns / 0.74 m | 33.46 ns / 10.04 m | 2.26 ns / 0.68 m |

FIG. 9

IMPROVING ACCURACY OF ROUND-TRIP TIME (RTT) IN HIGH ACCURACY DISTANCE MEASUREMENTS (HADM)

FIELD

This disclosure describes systems and methods for improving the accuracy of round trip time estimations used in high accuracy distance measurements.

BACKGROUND

Bluetooth Low Energy (BLE) is becoming a ubiquitous network protocol, being used for speakers, headphones, printers, and other devices. High accuracy distance measuring (HADM), also known as Channel Sounding (CS), has become a key feature of BLE. HADM allows a network device to determine the distance from that network device to another network device with high accuracy. This may be useful in spatial positioning applications and also useful for keyless entry in automobiles, through the use of FOB keys.

One method that may be used to measuring distance in HADM is based on round trip time (RTT) delay.

FIG. 1A shows the operation of HADM in RTT mode. The horizontal axis represents time. The system includes an initiator 1 and a reflector 2. The initiator 1 transmits a packet to the reflector 2. The initiator 1 starts a timer at the moment that the first bit of the packet reaches the transmit antenna. Some time after the initiator 1 starts transmitting, the reflector 2 begins receiving this packet. The difference between the start of transmission by the initiator 1 and the start of reception by the reflector 2 is the time of flight (ToF). As soon as this packet is detected by the reflector 2, the reflector 2 starts a timer. The reflector 2 then waits a predetermined amount of time and then transmits a packet back to the initiator 1. The reflector 2 stops its timer when the first bit of its packet reaches its transmit antenna. This time is referred to as the reflector time or t_ref in FIG. 1A. When the initiator 1 senses the incoming packet from the reflector 2, the initiator 1 stops its timer. This total time is referred to as initiator time or t_init in FIG. 1A. Note that both timers are compensated for delays through the respective read and transmit circuits. If the reflector time is subtracted from the initiator time and that difference is divided in half, the time of flight can be determined.

One issue associated with calculating round trip delay is the resolution of the sample clock. For example, BLE is transmitted at 1 Mbit per second. Even at a four time oversampling rate, the sampling clock has a period of 250 ns, which, assuming the speed of light, is equivalent to a distance of 75 meters. To improve the accuracy, as shown in FIG. 1B, the BLE specification recommends an equation that estimates the peak of the correlation based on three samples, referred to as the early sample (E), the prompt sample (P) and the late sample (L). These three points may be fit to a parabola to determine the time when the actual correlation peak occurs. The value $\hat{t}$ represents the difference in time between the edge of the internal clock and the peak of the correlation signal.

While this equation reduces the inaccuracy of the time based measurement, there are still issues associated with it. First, the correlation curve may not exactly resemble a parabola. Second, this equation is tuned to correlator based systems. However, the curve for a cost function system may be different than that for a correlator based system.

Therefore, it would be advantageous if there was a system and method of improving the accuracy of the measurement of round trip time in HADM systems. It would also be beneficial if this system and method operated with both correlator based systems and cost function based systems.

SUMMARY

A system and method to improve the accuracy of the measurement of round trip delay in a high accuracy distance measurement (HADM) is disclosed. In one embodiment, the traditional parabolic estimation is used. However, an estimation error is used to compensate for the inaccuracy of the parabolic estimation. This correction may reduce the standard deviation of a measurement by 50% or more. In another embodiment, the parabolic estimation is not used; rather, a different estimation is used, such as an absolute value estimation. In some tests, the absolute value estimation improved the mean measurement value and reduced the standard deviation by 50%.

According to one embodiment, a method of calculating time of flight between two network devices in a wireless network is disclosed. The method comprises transmitting a packet from a first network device, referred to as an initiator, to a second network device, referred to as a reflector; starting an initiator timer at the initiator when the packet begins transmission; receiving a return packet from the reflector in response to the packet; stopping the initiator timer when the return packet is present at the initiator; using a parabolic estimate to correct for resolution error in the initiator timer, wherein the parabolic estimate provides an estimated fractional delay; using the estimated fractional delay to calculate an estimation error; receiving a reflector time from the reflector; and determining the time of flight based on the initiator timer, the reflector time, the estimated fractional delay and the estimation error. In some embodiments, a presence of the return packet is determined by detecting a synchronization pattern, and wherein the synchronization pattern is used to determine when the return packet was first present at the initiator. In certain embodiments, the synchronization pattern is detected using a correlator. In certain embodiments, the synchronization pattern is detected using a cost function. In some embodiments, the parabolic estimate utilizes a value of a prompt sample (P), an early sample (E) and a late sample (L), each generated based on an oversample clock, and wherein the estimation error is calculated by: simulating a value of the prompt sample, the early sample and the late sample for all fractional delays within a period of the oversample clock; calculating the estimated fractional delay using an equation (E−L)/(2E+2L−4P); comparing the estimated fractional delay to an actual fractional delay; and calculating the estimation error as a difference between the estimated fractional delay and the actual fractional delay. In some embodiments, a table is used to determine the estimation error based on the estimated fractional delay. In some embodiments, an equation is used to determine the estimation error based on the estimated fractional delay. In some embodiments, the method further comprises starting a reflector timer when the packet is present at the reflector; stopping the reflector timer when the return packet begins transmitting from the reflector; using a parabolic estimate to correct for resolution error in the reflector timer, wherein the parabolic estimate provides an estimated reflector fractional delay; and using the estimated reflector fractional delay to calculate a reflector estimation error; wherein the reflector time is determined based on the reflector timer, the estimated reflector fractional delay and the reflector estimation error.

According to another embodiment, wireless network device for calculating distance using round trip time-based estimation is disclosed. The network device comprises a network interface, comprising an antenna; a processing unit; and a memory device, comprising instructions, which when executed by the processing unit, enable the wireless network device to: transmit a packet to a second network device, referred to as a reflector; start an initiator timer when the packet begins transmission; receive a return packet from the reflector in response to the packet; stop the initiator timer when the return packet is present at the wireless network device; use a parabolic estimate to correct for resolution error in the initiator timer, wherein the parabolic estimate provides an estimated fractional delay; use the estimated fractional delay to calculate an estimation error; receive a reflector time from the reflector; determine a time of flight based on the initiator timer, the reflector time, the estimated fractional delay and the estimation error; and calculate distance from the time of flight. In some embodiments, a presence of the return packet is determined by detecting a synchronization pattern, and wherein the synchronization pattern is used to determine when the return packet was first present at the wireless network device. In certain embodiments, the synchronization pattern is detected using a correlator. In certain embodiments, the synchronization pattern is detected using a cost function. In some embodiments, a table is used to determine the estimation error based on the estimated fractional delay. In some embodiments, an equation is used to determine the estimation error based on the estimated fractional delay.

According to another embodiment, a method of calculating time of flight between two network devices in a wireless network is disclosed. The method comprises transmitting a packet from a first network device, referred to as an initiator, to a second network device, referred to as a reflector; starting an initiator timer at the initiator when the packet begins transmission; receiving a return packet from the reflector in response to the packet; stopping the initiator timer when the return packet is present at the initiator; using an estimate to correct for resolution error in the initiator timer, wherein the estimate is not a parabolic estimation and provides an estimated fractional delay; receiving a reflector time from the reflector; and determining the time of flight based on the initiator timer and the estimated fractional delay. In some embodiments, a presence of the return packet is determined by detecting a synchronization pattern, and wherein the synchronization pattern is used to determine when the return packet was first present at the wireless network device. In certain embodiments, the synchronization pattern is detected using a correlator. In certain embodiments, the synchronization pattern is detected using a cost function. In some embodiments, the estimate comprises a "V" estimation, wherein the "V" estimation is performed using $Y=\alpha|x|+c$, wherein $\alpha$ is a scaling factor, x is a fractional delay time, Y is a cost function or correlation score.

BRIEF DESCRIPTION OF THE DRAWINGS

For a better understanding of the present disclosure, reference is made to the accompanying drawings, in which like elements are referenced with like numerals, and in which:

FIG. 9 shows a comparison of different estimation techniques.

DETAILED DESCRIPTION

As described above, round trip time (RTT) based distance estimation relies on accurate measurement of the time for a packet to be transmitted to a reflector and a subsequent packet to be transmitted back to the initiator. The present disclosure presents several systems and methods that improve the accuracy of that measurement.

Figure 2:
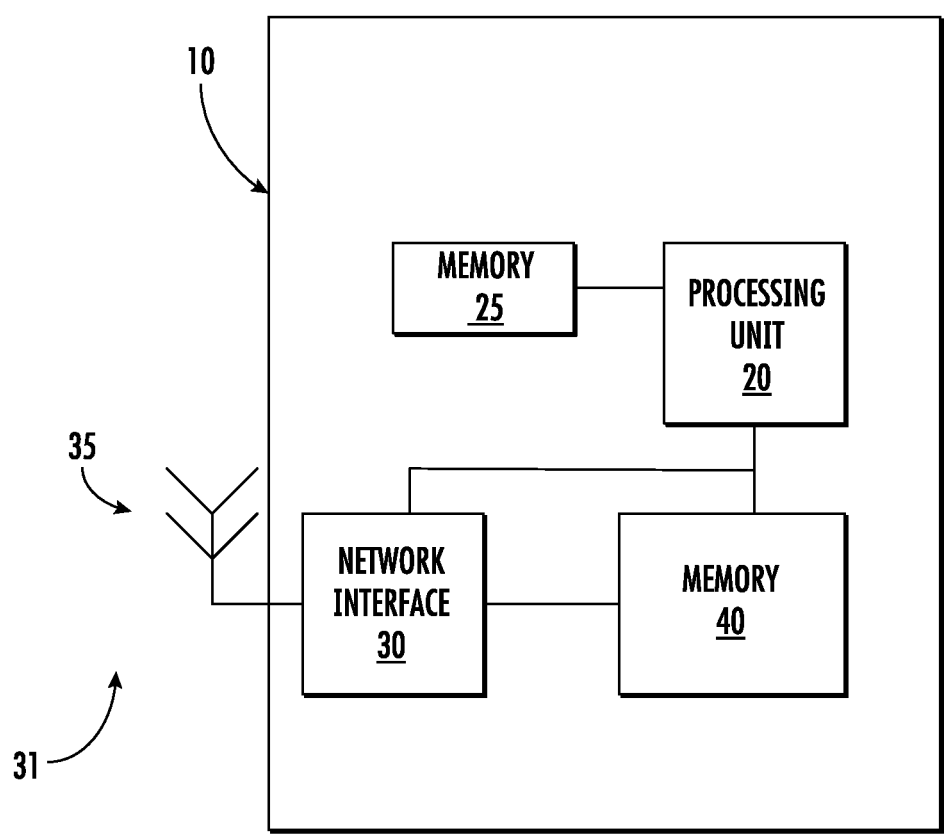
FIG. 2 shows a block diagram of a wireless network device.

FIG. 2 shows a block diagram of a representative network device 10 that implements improved accuracy for round trip time-based distance estimation according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network as long as that network protocol supports round trip time delay-based distance estimation.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the wireless network 31. Although not shown, the network device 10 also has a power supply, which may be a battery or a connection to a permanent power source, such as a wall outlet.

While the processing unit 20, the memory device 25, the network interface 30, and the second memory device 40 are shown in FIG. 2 as separate components, it is understood that some or all of these components may be integrated into a single electronic component. Rather, FIG. 2 is used to illustrate the functionality of the network device 10, not its physical configuration.

Figure 3A:
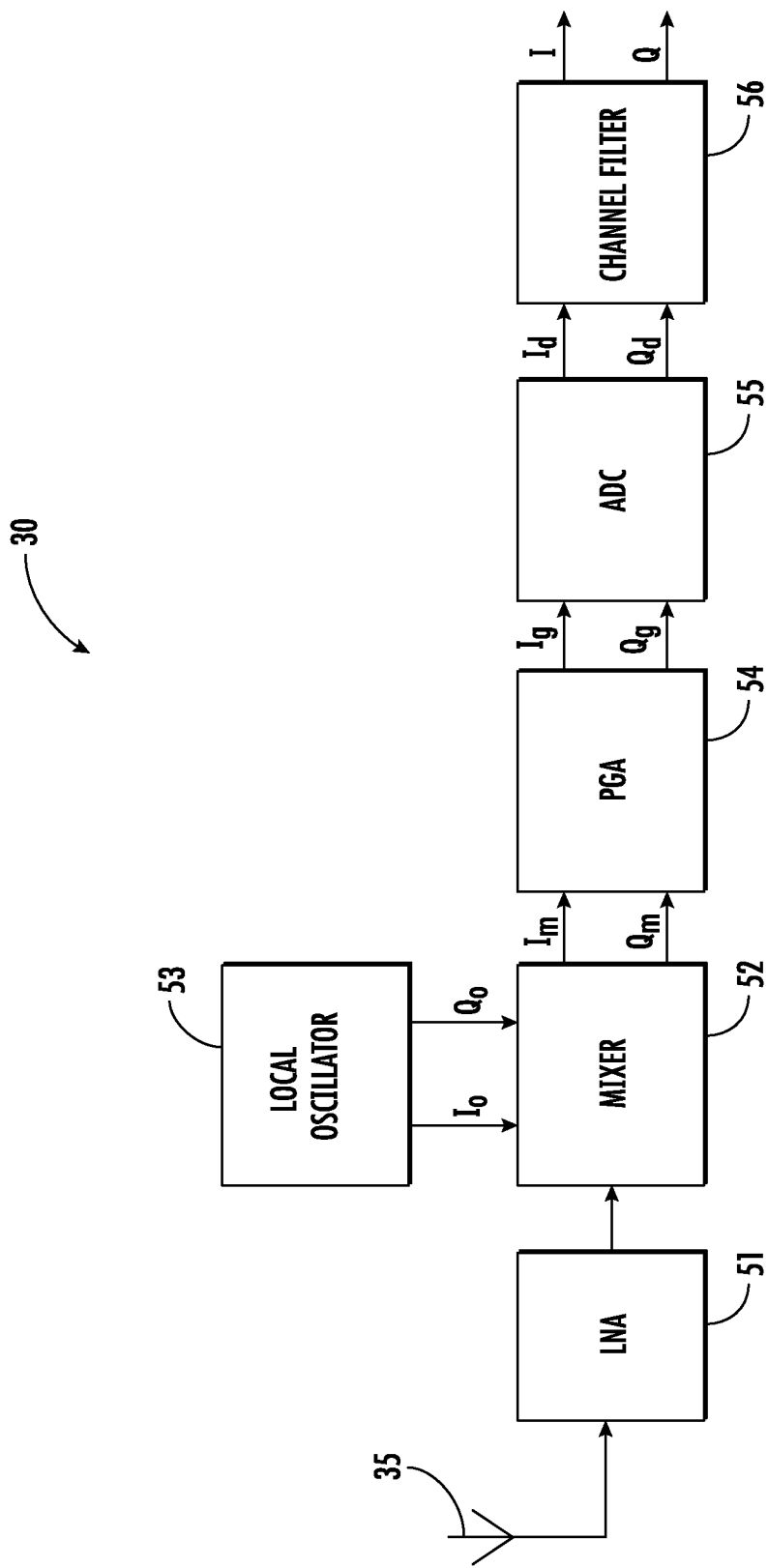
FIG. 3A is a detailed block diagram of a first part of the network interface of the network device of FIG. 2.
Figure 3B:
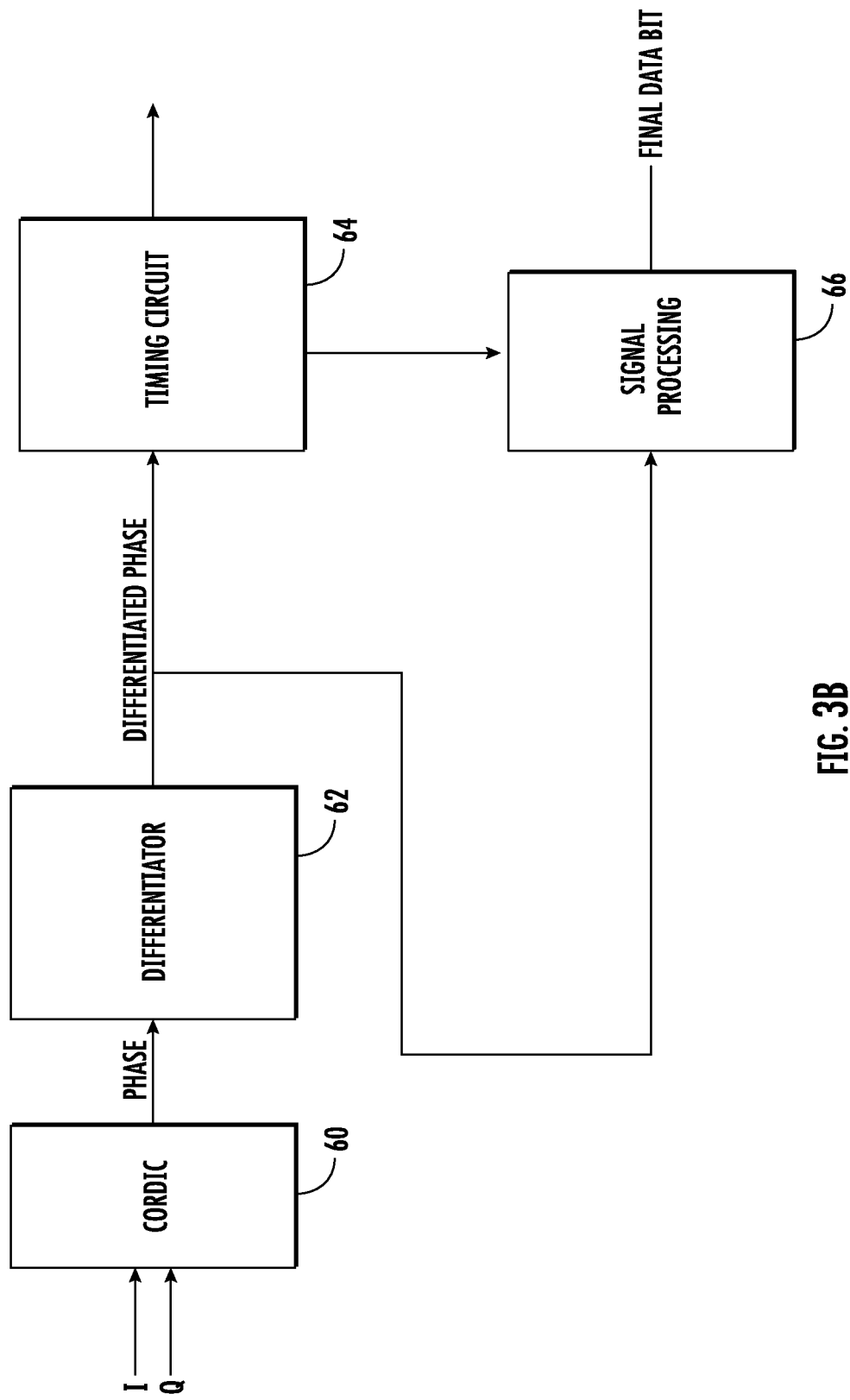
FIG. 3B is a detailed block diagram of a second part of the network interface of the network device of FIG. 2.

FIG. 3A-3B provide a more detailed illustration of the network interface 30. As shown in FIG. 3A, the wireless signals first enter the network interface 30 through the antenna 35. The antenna 35 is in electrical communication with a low noise amplifier (LNA) 51. The LNA 51 receives a very weak signal from the antenna 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. In certain embodiments, the ADC 55 performs multiple conversions for each data bit. For example, the ADC 55 may operate using an oversample clock, which is a multiple of the incoming data bit rate. For example, the oversample clock may operate at 4 times or 5 times the incoming data rate. Thus, there may be 4 or 5 sets of $I_d$ and $Q_d$ created during each bit time. These digital signals may then pass through a channel filter 56. The filtered signals are referred to as I and Q. The output of the channel filter 56 may be referred to as the baseband signals. The components that are used to receive the signal from the antenna 35 and produce the baseband signals are referred to as the RF circuit.

These I and Q signals can be used to recreate the amplitude and phase of the original signal. In certain embodiments, the I and Q values may be considered complex numbers, wherein the I value is the real component and the Q value is the imaginary component.

As shown in FIG. 3B, the I and Q signals then enter a CORDIC (Coordination Rotation Digital Computer) 60, which determines the amplitude and phase of the signals. Amplitude is given as the square root of $I^2$ and $Q^2$, while phase is given by the $\tan^{-1}$ (Q/I). In some embodiments, the CORDIC 60 may be a hardware component disposed in the network interface 30. In other embodiments, the CORDIC may be implemented in software. In other embodiments, the phase is determined using a different mechanism.

The phase output from the CORDIC 60 is then supplied as an input to the differentiator 62. As is well known, the derivative of phase is frequency. Thus, by subtracting the values of two adjacent phase values, and optionally dividing the difference by a time duration, a value that is indicative of frequency can be determined. In some embodiments, the differentiator 62 may be a hardware component disposed in the network interface 30. In other embodiments, the differentiator may be implemented in software. The differentiated phase signal may be a signed value, such as an 8-, 16- or 32-bit signed value.

The differentiated phase signal is used as an input to a Timing Circuit 64. The Timing Circuit 64 is used to detect when the synchronization pattern has been detected. This can be done by creating a cost function where a sequence of data samples is compared to the known synchronization pattern. The point at which this cost function is minimized is identified as the synchronization pattern.

In another embodiment, the synchronization pattern is detected by use of a set of correlation coefficients. The correlation coefficients are each multiplied with a respective bit of the incoming data pattern. Each of these products are then summed to compute a correlation score. The point at which the correlation score is a maximum is identified as the synchronization pattern.

The rest of the receive circuit can then use this indication to properly align the incoming bits into bytes. Of course, other mechanisms may be used to identify the synchronization pattern.

The differentiated phase may also enter a signal processing block 66, which generates the final data bits. The signal processing block 66 may be a Viterbi equalizer in some embodiments.

Figure 1A:
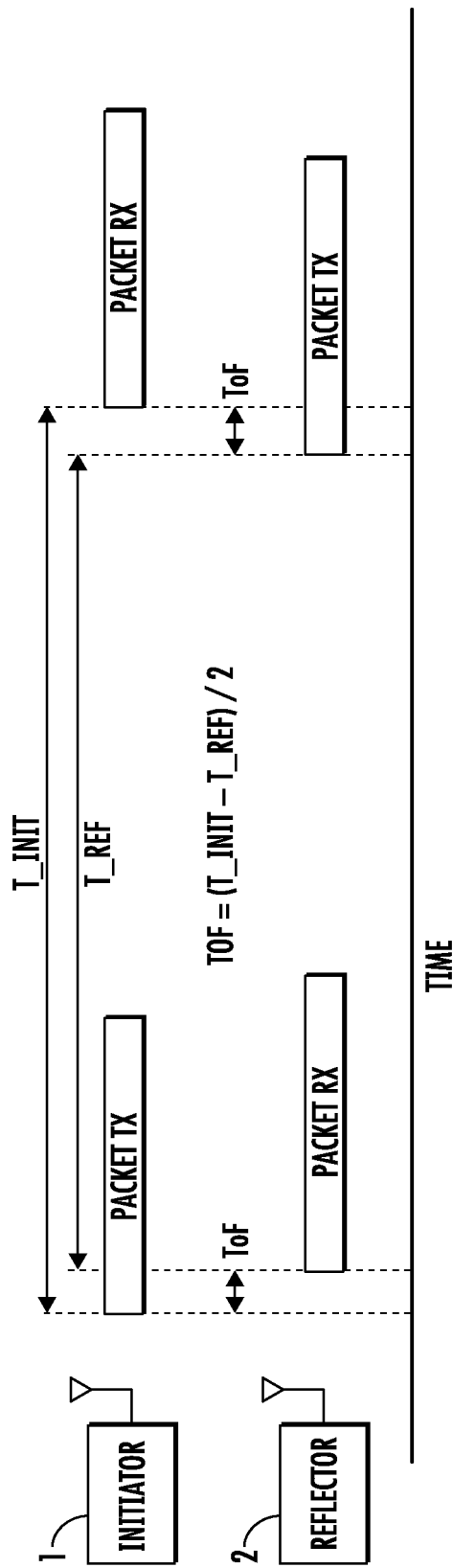
FIG. 1A shows how distance using HADM RTT is calculated.

To determine round trip delay for distance estimation, the network device 10 transmits a packet to a remote device and waits for a response packet. The network device 10 begins a timer as the packet is being transmitted. The timer is terminated when the return packet from the remote device is detected. This time is referred to as the initiator time or t_init in FIG. 1A.

The network device 10 also receives information from the remote device informing it of the time from the point where the packet reached the remote device to the time that the return packet began transmitting. This time is referred to as the reflector time or t_ref in FIG. 1A. By subtracting the reflector time from the initiator time, the time of flight may be determined.

However, the timer used to determine the initiator time (and the reflector time) may have a resolution equal to that of the oversample clock. Thus, if the incoming data bit rate is 1 Mbit/sec, the timer may have a resolution of 200 ns, assuming an oversample rate of 5. If the oversample rate is different, the resolution of the timer may differ. The beginning of this return packet can be determined based on the time at which the Timing Circuit 64 detected the synchronization pattern. The processing unit 20 can use the time of synchronization detection to then determine when the packet began. Specifically, the position of the synchronization pattern within the packet is well known. Thus, once the synchronization pattern is detected, the arrival time of the first bit of the incoming packet can be determined.

However, there is inaccuracy in this timing technique. Specifically, while the packet transmitted by the network device is aligned to the oversample clock, the packet received from the remote device is not. Therefore, there is an uncertainty of 200 ns in the timed value.

As noted above, this can be addressed by more accurately approximating when the detection of the synchronization pattern actually happened. The BLE specification assumes that the correlation function is a parabola where the peak of the parabola is aligned with the exact detection of the synchronization pattern. Specifically, three points are examined; referred to as Early (E), Prompt (P) and Late (L). Prompt is the sample with the maximum correlation score, while Early is the immediately preceding correlation score and Late is the immediately proceeding correlation score. By assuming that the correlation score behaves like a parabola, the offset between the Prompt sample and the actual peak can be estimated. This offset is then added to or subtracted from the timer to create a more accurate representation of the actual time between the transmission of the packet and the receipt of the return packet.

Figure 1B:
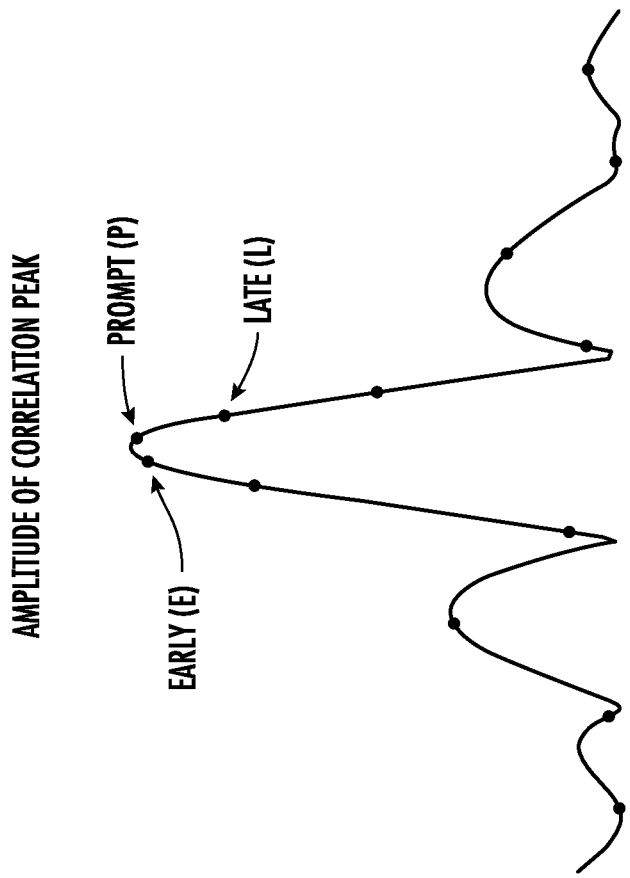
FIG. 1B shows how the timing correction is calculated according to the prior art.

However, this parabolic estimation, which is shown in FIG. 1B, has two limitations. First, the correlation score may not behave exactly as a parabola, which affects the accuracy of the approximation. Second, this parabolic estimation does not necessarily apply to systems that utilize cost functions, rather than correlators, to detect the synchronization pattern.

Thus, in one embodiment, the network device 10 includes an error correction step that follows the parabolic estimation described above. For example, in one embodiment, a simulation is performed where the peak of the correlation score is varied over 200 or 250 ns (depending on the period of the oversample clock). At each point over this interval, the expected correlation score of the Early, Prompt and Late samples is calculated. In other words, a simulation is performed where the center of the data bits is varied by 100 ns (the center of the bit) in both the positive and negative directions. Thus, a value of 50 ns on the horizontal axis indicates that the center of the data bit occurred 50 ns before the edge of the oversample clock. Similarly, a value of 125 ns on the horizontal axis indicates that the center of the data bit occurred 25 ns after the edge of the oversample clock.

Figure 4:
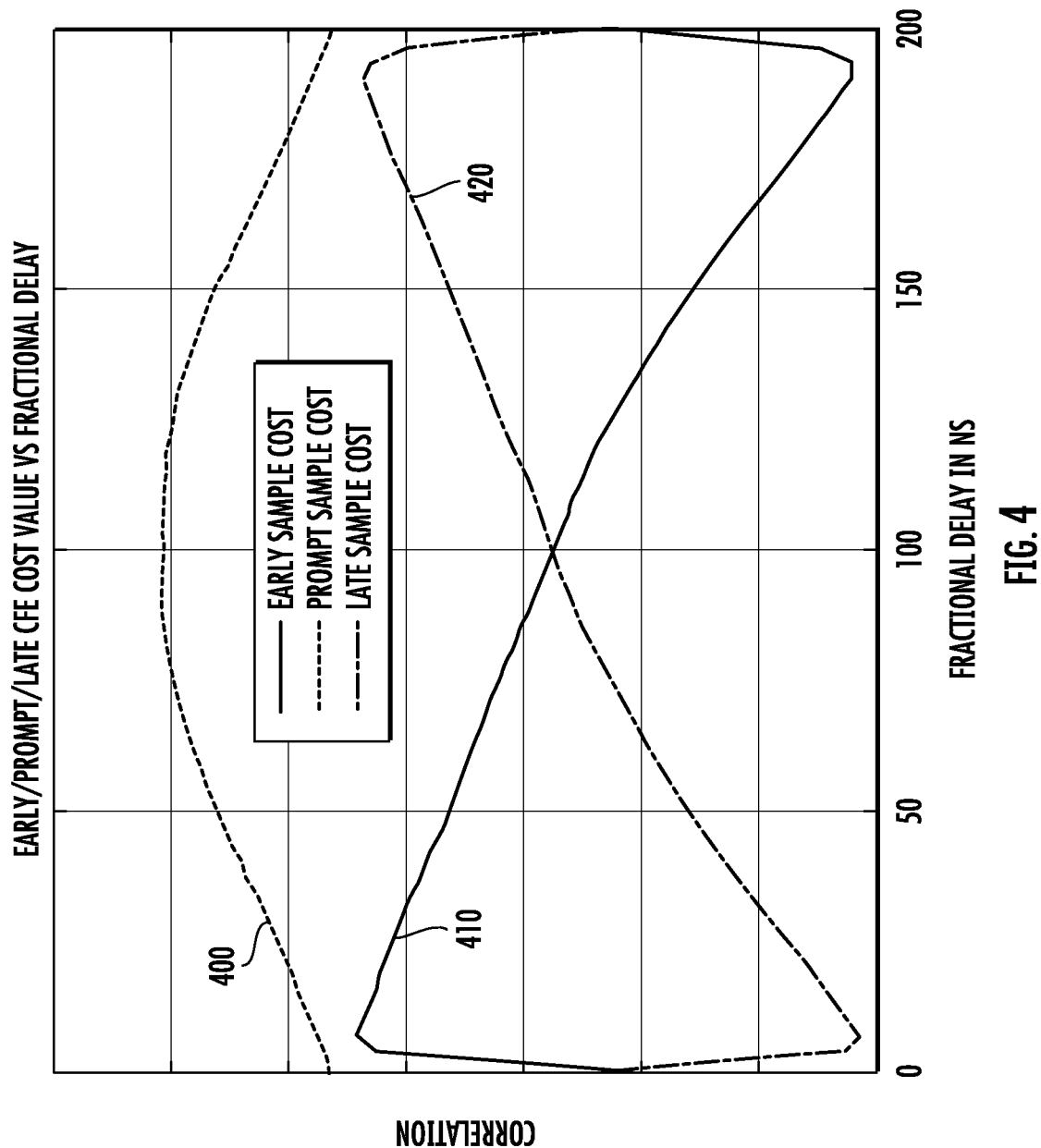
FIG. 4 shows the correlation scores for the Early, Prompt and Late samples as a function of position in the window.

These three simulated values are shown in FIG. 4. Note that the correlation score of the Prompt sample 400 increases until it reaches about 100 ns (the center of the bit) and then decreases thereafter. The correlation score of the Early sample 410 decreases over the interval while the correlation score of the Late sample 420 increases over the interval. Note that the correlation score of the Early sample 410 and Late sample 420 are equal at 100 ns, indicating that the clock is perfectly aligned with the data bit.

Figure 5:
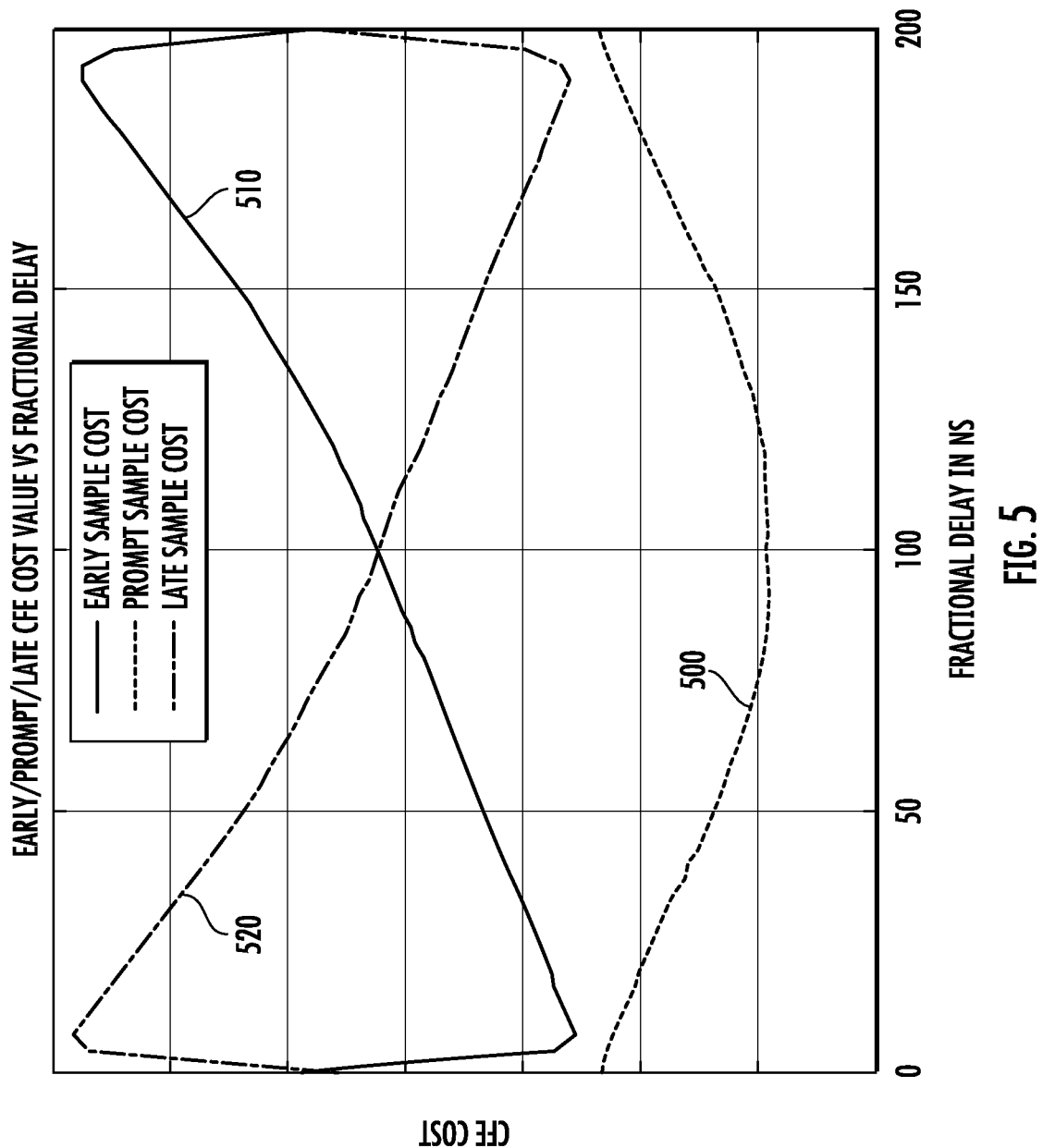
FIG. 5 shows the cost function for the Early, Prompt and Late samples as a function of position in the window.

Note that while FIG. 4 assumes that the timing circuit 64 utilizes a correlator, this approach is also useful if the timing circuit 64 using a cost function. FIG. 5 shows the data when a cost function is used. Unlike a correlator, a cost function seeks to find the minimum values of all parameters. Therefore, FIG. 5 appears to be similar to FIG. 4, but is inverted about the horizontal axis. Thus, the cost of the Prompt Sample 500 decreases until it reaches about 100 ns (the center of the bit) and then increases thereafter. The cost of the Early sample 510 increases over the interval while the cost of the Late sample 520 decreases over the interval. Note that the cost of the Early sample 510 and Late sample 520 are equal at 100 ns, indicating that the clock is perfectly aligned with the data bit.

Note that the graphs shown in FIG. 4 and FIG. 5 can also be calculated if the oversample clock is different than 5 MHz. For example, the oversample clock may be 4 MHz. In this case, the simulation would be performed over a range of 250 ns.

Figure 6:
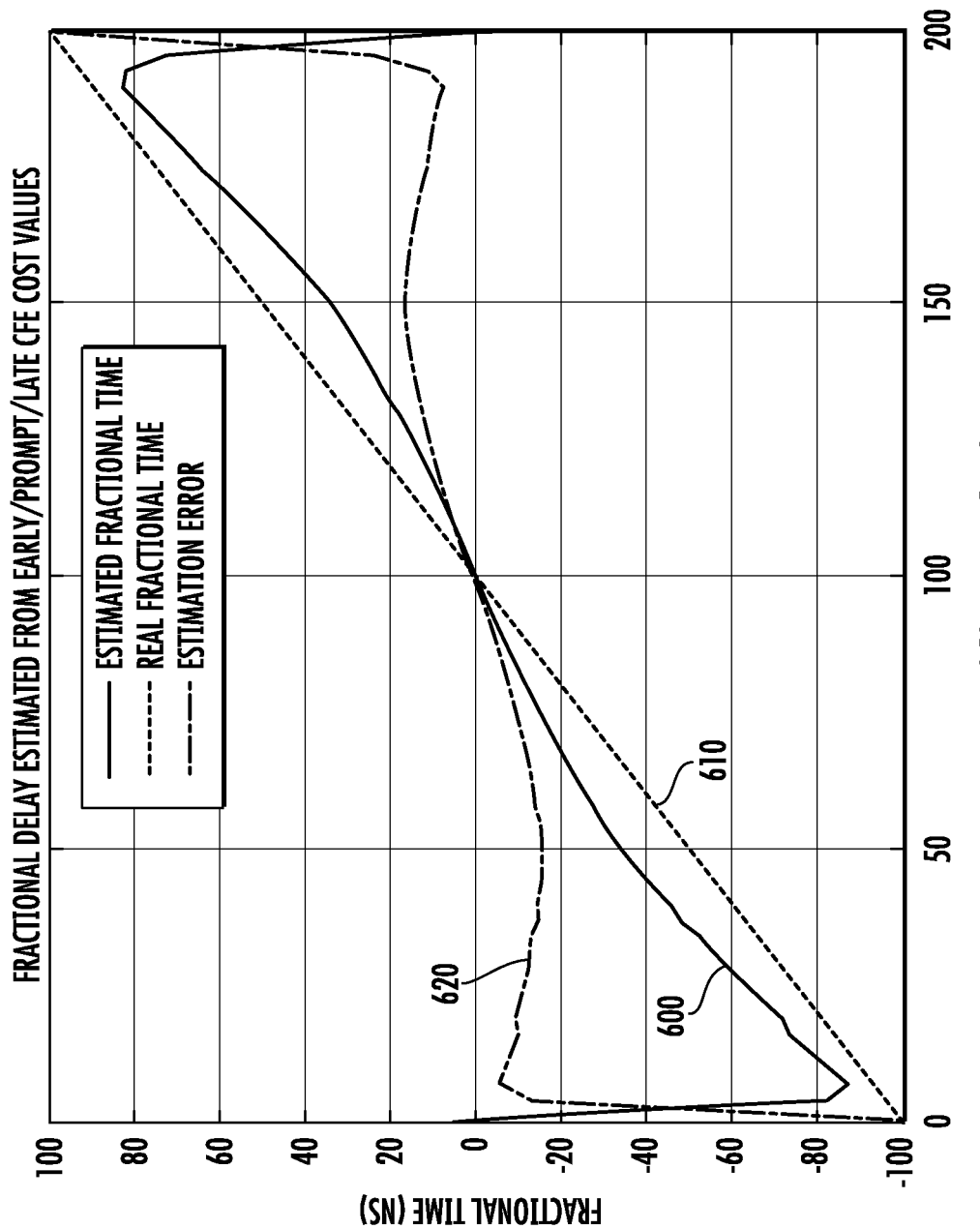
FIG. 6 shows the estimation error using the data from FIG. 4 or FIG. 5.

The data in FIG. 4 and FIG. 5 is then used to create the estimated fractional delay 600 in FIG. 6. In other words, for each data point on the interval, the value of (E−L)/(2E+2L−4P) is calculated using the data in FIG. 4 or FIG. 5. The actual fractional delay 610 can be expressed as the value on the horizontal axis, less 100 ns, and is therefore a straight line. The estimation error 620 is then calculated as the difference between the actual fractional delay 610 and the estimated fractional delay 600. This estimation error 620 can then be incorporated into the calculation of the round trip delay.

Having defined the estimation error, this information can be used in a number of ways. In one embodiment, the network device creates an equation that relates the fractional delay estimate from the parabolic estimate with the estimation error. In another embodiment, the network device creates a table where each value of the fractional delay estimate from the parabolic estimate has a corresponding estimation error. In some embodiments, the fractional delay estimate is divided into a number of bins, where each bin has a unique estimation error. For example, there may be 2 bins, where fractional delay estimates of less than 100 ns are provided with one estimation error, and fractional delay estimates of more than 100 ns are provided with a second estimation error. In another embodiment, there may be 5 bins, wherein fractional delays of less than a first value are provided with a first estimation error; fractional delays greater than the first value but less than a second value are provided with a second estimation error; fractional delays greater than the second value but less than a third value are provided with a third estimation error; fractional delays greater than the third value but less than a fourth value are provided with a fourth estimation error; and fractional delays greater than the fourth value are provided with a fifth estimation error. Of course, any number of bins may be utilized.

Figure 7:
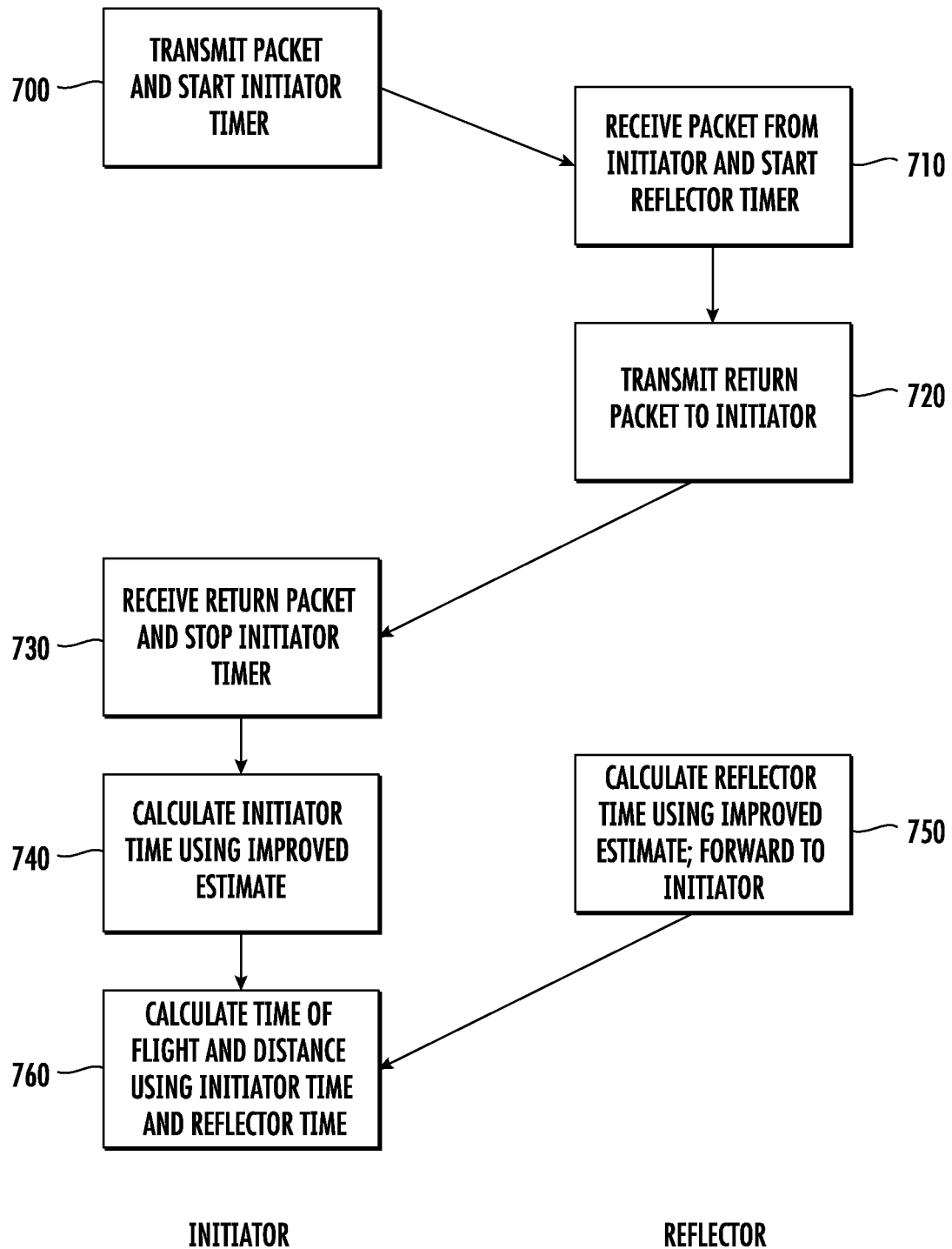
FIG. 7 shows a flowchart illustrating the operation of the network device.

FIG. 7 shows a flowchart showing the calculation of the time of flight using this approach. First, as shown in Box 700, the network device 10, acting as the initiator, transits a packet to a remote device, acting as a reflector. Also, the network device begins an initiator timer. In Box 710, the remote device receives this packet and starts a reflector timer. As described above, the remote device may use the detection of the synchronization pattern to determine when the packet actually first reaches the remote device. As shown in Box 720, the remote device then transmits a return packet back to the network device.

As shown in FIG. 730, the network device receives the return packet from the remote device. As described above, the network device may use the detection of the synchronization pattern to determine when the return packet actually first reaches the network device. Then, as shown in Box 740, the network device calculates the initiator time, which is the time from when the packet started transmission to the time when the return packet first appeared at the network device. In calculating this initiator time, the network device utilizes an improved estimate. This improved estimate may comprise utilizing the parabolic estimation shown in FIG. 1B coupled with the estimation error procedure described with respect to FIGS. 4-6.

As shown in Box 750, the remote device informs the network device of the reflector time, which is the time from when the packet from the initiator first appeared at the remote device to the time that the return packet started transmission. In calculating this reflector time, the remote device may utilize an improved estimate. This improved estimate may comprise utilizing the parabolic estimation shown in FIG. 1B coupled with the estimation error procedure described with respect to FIGS. 4-6.

Finally, as shown in Box 760, the network device subtracts the reflector time from the initiator time to determine the time of flight, wherein time of flight is equal to half the difference between the initiator time and the reflector time. This can then be used to determine distance using the equation, distance=c*time of flight, wherein c is the speed of light.

While the above description utilizes the parabolic estimate suggested in the BLE specification, other embodiments are also possible. For example, the correlation function (or cost function) may be approximated using a different function.

For example, in one embodiment, the correlation score and/or the cost function may be approximated as a "V" shape (or inverted "V" shape).

In this embodiment, the "V" estimation can be defined using the following equation:

$Y=\alpha|x|+c$, wherein $\alpha$ is a scaling factor, $x$ is the fractional delay time, $y$ is the cost function (or correlation score) and $c$ is a constant.

Figure 8B:
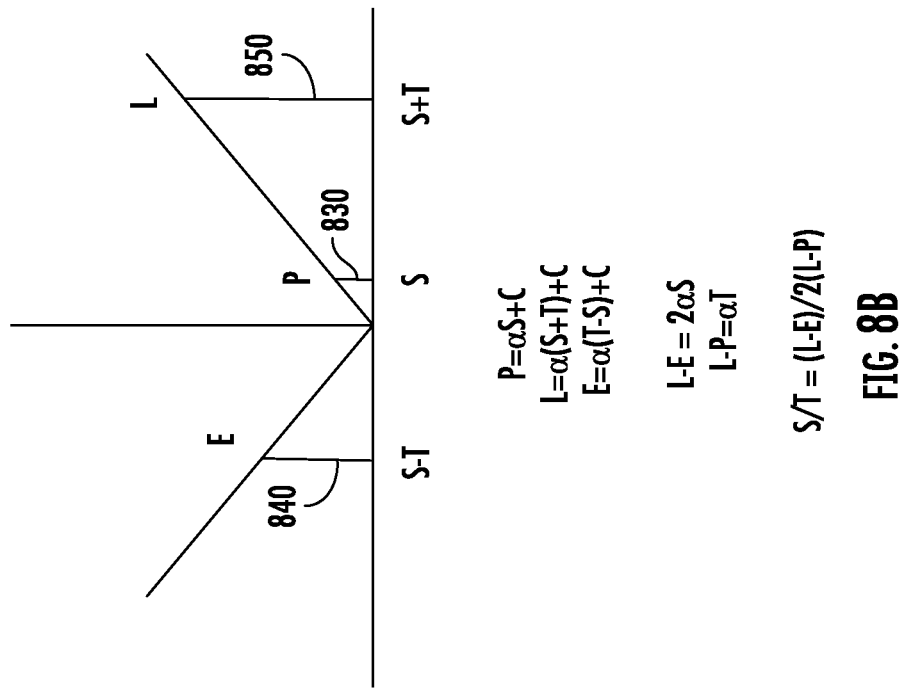
FIGS. 8A-8B show the derivation of the estimation error for a "V" estimation.
Figure 8A:
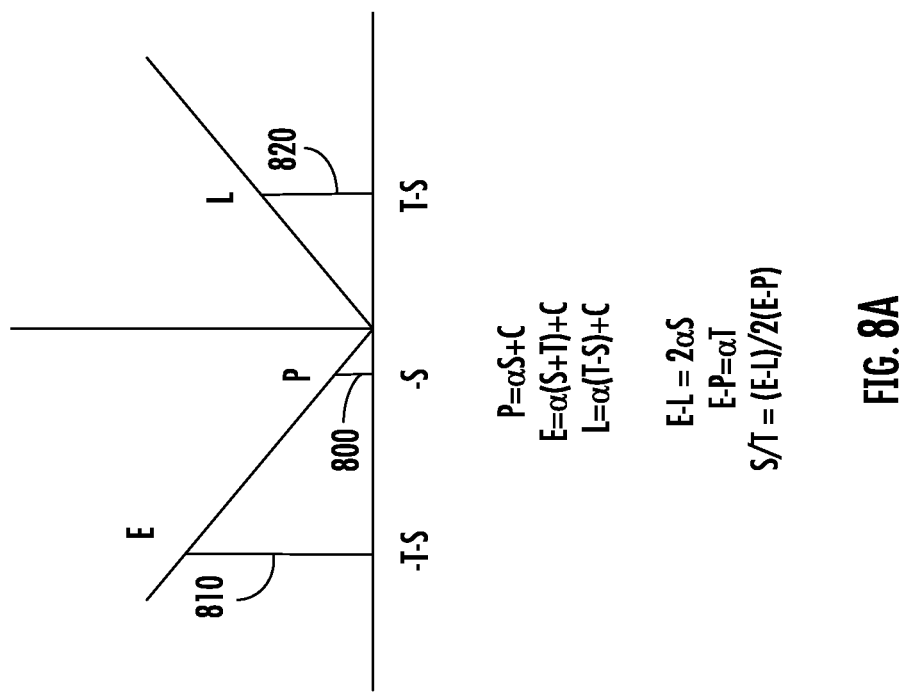

As shown in FIG. 8A, the Prompt sample 800 and the Early sample 810 may both be before the actual peak (where peak is defined as the minimal value). The Late sample 820 is after the actual peak. Thus, in this configuration:

$P=\alpha S+c$ (where $S$ is the actual sample time)

$E=\alpha(T+S)+c$ (where $T$ is the sample period)

$L=\alpha(T-S)+C$

Solving for S/T, yields:

$S/T=(E-L)/2*(E-P)$

As shown in FIG. 8B, the Prompt sample 830 and the Late sample 850 may both be after the actual peak (where peak is defined as the minimal value). The Early sample 840 is before the actual peak.

Thus, in this configuration:

$P=\alpha S+c$ $E=\alpha(T-S)+c$ $L=\alpha(T+S)+C$

Solving for S/T, yields:

$S/T=(L-E)/2*(L-P)$

Combining these equations, yields the following result:

if $E<L, \hat{t} = \dfrac{E-L}{2L-2P}$ else $\hat{t} = \dfrac{E-L}{2E-2P}$

While FIG. 8A-8B shows the use of a linear function with an absolute value, the use of absolute value is applicable to other functions as well. More specifically, this approach of using the absolute value function can be used for any function that is not symmetric about the Y axis. These functions include all odd functions, such as functions having an odd x exponent, which includes linear functions ("V" curve or inverted "V" curve)) and cube functions. These functions also include functions having an x exponent between 0 and 1 such as square root functions. As an example, the estimation may be modeled using $Y=\alpha\sqrt{|x|}+c$, wherein $\alpha$ is a scaling factor, x is the fractional delay time, y is the cost function (or correlation score) and c is a constant. A similar expression may be created for any of the functions described above. Thus, the derivation shown above and in FIGS. 8A-8B can be applied to any of these functions.

Additionally, the technique shown in FIG. 8A-8B can be applied to even functions that are not parabolic. For example, the correlation value may be modelled as a quartic function ($Y=x^4$). Additionally, the correlation value may be modelled as a trigonometric function, such as $Y=\cos(x)$.

In these embodiments, the network device and the remote device do not utilize the parabolic estimation. Rather, the equations related to the "V" estimation may be used. In other embodiments, other odd functions may be used. Alternatively, equations related to even function that are not parabolic may be used. Thus, referring to FIG. 7, the equations shown above (or other equations related to any function that is not a parabola) are used as the improved estimate (as shown in FIG. 7). For example, in one embodiment, the equations described in FIGS. 8A-8B are used and may be referred to as the absolute value estimation or the "V" estimation.

The present system has many advantages. As noted above, the standard parabolic estimation may be inaccurate. The use of an estimation error correction or a different estimation function may improve the distance results that are generated using round trip time-based distance estimation. FIG. 9 shows a table that demonstrates this improvement.

Simulations were performed assuming a distance of 1 meter and a distance of 10 meters. Six different approaches to improving the sample rate resolution were simulated. These include:
  No fine correction applied (first row)
  Correlation with standard parabolic estimation (second row)
  Cost Function with standard parabolic estimation (third row)
  Cost Function with standard parabolic estimation and 1 bit estimation error (fourth row)
  Cost Function with standard parabolic estimation and 5 bit estimation error (fifth row)
  Cost function with absolute value estimation (sixth row)

Note that the cost function with the absolute value estimation had the more accurate mean and smaller standard deviation at both 1 m and 10 m. It is also noted that the use of estimation error as explained in FIGS. 4-6 improved the results as compared to the third row of the graph. Specifically, the standard deviation was reduced by 50% in both the 1 m and 10 m tests. Thus, the methods described herein can improve the accuracy of round trip time-based distance estimation without any changes to the hardware implementation.

Note that the estimation error based correction may also be applied to an estimation using one of the proposed alternative model function such as the V estimation. In other words, the two methods proposed here can be combined for even higher accuracy.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of calculating a time of flight between two network devices in a wireless network, comprising:
   transmitting a packet from a first network device, referred to as an initiator, to a second network device, referred to as a reflector;
   starting an initiator timer at the initiator when the packet begins transmission;
   receiving a return packet from the reflector in response to the packet;
   stopping the initiator timer when the return packet is present at the initiator;
   using a parabolic estimate to correct for resolution error in the initiator timer, wherein the parabolic estimate uses a value of a prompt sample (P), an early sample (E) and a late sample (L), each generated based on an oversample clock to provide an estimated fractional delay, which is a fraction of a period of the initiator timer;
   using the estimated fractional delay to calculate an estimation error, which is an error associated with the estimated fractional delay calculated using the parabolic estimate;
   receiving a reflector time from the reflector; and
   determining the time of flight based on the initiator timer, the reflector time, the estimated fractional delay and the estimation error.

2. The method of claim 1, wherein a presence of the return packet is determined by detecting a synchronization pattern, and wherein the synchronization pattern is used to determine when the return packet was first present at the initiator.

3. The method of claim 2, wherein the synchronization pattern is detected using a correlator.

4. The method of claim 2, wherein the synchronization pattern is detected using a cost function.

5. The method of claim 1, wherein the estimation error is calculated by:
   simulating a value of the prompt sample, the early sample and the late sample for all fractional delays within a period of the oversample clock;
   calculating the estimated fractional delay using an equation $(E-L)/(2E+2L-4P)$;
   comparing the estimated fractional delay to an actual fractional delay; and
   calculating the estimation error as a difference between the estimated fractional delay and the actual fractional delay.

6. The method of claim 1, wherein a table is used to determine the estimation error based on the estimated fractional delay.

7. The method of claim 1, wherein an equation is used to determine the estimation error based on the estimated fractional delay.

8. The method of claim 1, further comprising:
   starting a reflector timer when the packet is present at the reflector;
   stopping the reflector timer when the return packet begins transmitting from the reflector;
   using a parabolic estimate to correct for resolution error in the reflector timer, wherein the parabolic estimate provides an estimated reflector fractional delay; and
   using the estimated reflector fractional delay to calculate a reflector estimation error; wherein the reflector time is determined based on the reflector timer, the estimated reflector fractional delay and the reflector estimation error.

9. A wireless network device for calculating distance using round trip time-based estimation, comprising:
   a network interface, comprising an antenna;
   a processing unit; and
   a memory device, comprising instructions, which when executed by the processing unit, enable the wireless network device to:
   transmit a packet to a second network device, referred to as a reflector;
   start an initiator timer when the packet begins transmission;
   receive a return packet from the reflector in response to the packet;
   stop the initiator timer when the return packet is present at the wireless network device;
   use a parabolic estimate to correct for resolution error in the initiator timer, wherein the parabolic estimate uses a value of a prompt sample (P), an early sample (E) and a late sample (L), each generated based on an oversample clock to provide an estimated fractional delay, which is a fraction of a period of the initiator timer;
   use the estimated fractional delay to calculate an estimation error, which is an error associated with the estimated fractional delay calculated using the parabolic estimate;
   receive a reflector time from the reflector;
   determine a time of flight based on the initiator timer, the reflector time, the estimated fractional delay and the estimation error; and
   calculate distance from the time of flight.

10. The wireless network device of claim 9, wherein a presence of the return packet is determined by detecting a synchronization pattern, and wherein the synchronization pattern is used to determine when the return packet was first present at the wireless network device.

11. The wireless network device of claim 10, wherein the synchronization pattern is detected using a correlator.

12. The wireless network device of claim 10, wherein the synchronization pattern is detected using a cost function.

13. The wireless network device of claim 9, wherein a table is used to determine the estimation error based on the estimated fractional delay.

14. The wireless network device of claim 9, wherein an equation is used to determine the estimation error based on the estimated fractional delay.

15. A method of calculating a time of flight between two network devices in a wireless network, comprising:
   transmitting a packet from a first network device, referred to as an initiator, to a second network device, referred to as a reflector;
   starting an initiator timer at the initiator when the packet begins transmission;

receiving a return packet from the reflector in response to the packet;

stopping the initiator timer when the return packet is present at the initiator;

using an estimate to correct for resolution error in the initiator timer, wherein the estimate is an even function that is not a parabolic estimation which uses a value of a prompt sample (P), an early sample (E) and a late sample (L), each generated based on an oversample clock to provide and provides an estimated fractional delay, which is a fraction of a period of the initiator timer;

receiving a reflector time from the reflector; and determining the time of flight based on the initiator timer and the estimated fractional delay.

16. The method of claim 15, wherein a presence of the return packet is determined by detecting a synchronization pattern, and wherein the synchronization pattern is used to determine when the return packet was first present at the initiator.

17. The method of claim 16, wherein the synchronization pattern is detected using a correlator.

18. The method of claim 16, wherein the synchronization pattern is detected using a cost function.

19. The method of claim 15, wherein the estimate comprises a "V" estimation, wherein the "V" estimation is performed using $Y=\alpha|x|+c$, wherein $\alpha$ is a scaling factor, x is a fractional delay time, Y is a cost function or correlation score.

* * * * *